United States Patent
Urzhumov (10) Patent No.: US 10,928,614 B2
(45) Date of Patent: Feb. 23, 2021

(54) DIFFRACTIVE CONCENTRATOR STRUCTURES

(71) Applicant: Searete LLC, Bellevue, WA (US)

(72) Inventor: Yaroslav A. Urzhumov, Bellevue, WA (US)

(73) Assignee: Searete LLC, Bellevue, WA (US)

( * ) Notice: Subject to any disclaimer, the term of this patent is extended or adjusted under 35 U.S.C. 154(b) by 437 days.

(21) Appl. No.: 15/868,215

(22) Filed: Jan. 11, 2018

(65) Prior Publication Data
US 2018/0259757 A1    Sep. 13, 2018

Related U.S. Application Data (60) Provisional application No. 62/445,023, filed on Jan. 11, 2017.

(51) Int. Cl.
| | | |
|---|---|---|
| *H01Q 13/02* | (2006.01) | |
| *G02B 19/00* | (2006.01) | |
| *G02B 1/00* | (2006.01) | |
| *G02B 3/08* | (2006.01) | |

(52) U.S. Cl.
CPC ......... *G02B 19/0009* (2013.01); *G02B 1/002* (2013.01); *G02B 3/08* (2013.01); *G02B 19/0014* (2013.01); *G02B 19/0019* (2013.01); *G02B 19/0023* (2013.01)

(58) Field of Classification Search
CPC ................ G02B 1/002; G02B 19/0009; G02B 19/0014; G02B 19/0019; G02B 19/0023; G02B 3/08; G02B 1/00; G02B 19/00
See application file for complete search history.

(56) References Cited

U.S. PATENT DOCUMENTS

| | | | | |
|---|---|---|---|---|
| 4,114,592 A | * | 9/1978 | Winston ................ | F24S 23/12 126/683 |
| 4,390,243 A | * | 6/1983 | Hammerschlag ........ | G02B 5/00 359/601 |
| 5,208,563 A | | 5/1993 | Russell et al. | |
| 5,280,557 A | * | 1/1994 | Nwasokwa ............. | F24S 23/00 385/146 |
| 6,657,580 B1 | | 12/2003 | Edwards et al. | |
| 6,903,261 B2 | * | 6/2005 | Habraken ........... | H01L 31/0543 136/246 |
| 7,546,012 B2 | * | 6/2009 | Bratkovski .......... | G02B 6/4206 385/15 |

(Continued)

FOREIGN PATENT DOCUMENTS

WO    2003-058809    7/2003

OTHER PUBLICATIONS

PCT International Search Report; International App. No. PCT/US2019/049300; dated Dec. 20, 2019; pp. 1-4.

(Continued)

*Primary Examiner* — Balram T Parbadia
(74) *Attorney, Agent, or Firm* — Phillips Winchester; Justin K. Flanagan (57) ABSTRACT

Systems, methods, and apparatus are described to provide a large emittance angle and a large beamforming aperture for radiation emitted by a relatively small transmit aperture. For example, a diffractive concentrator structure can provide a large emittance angle and a large beamforming aperture for radiation emitted by a small transmit aperture and delivered to a larger exit aperture.

31 Claims, 4 Drawing Sheets

(56) References Cited

U.S. PATENT DOCUMENTS

| | | | |
|---|---|---|---|
| 9,000,293 B2* | 4/2015 | Caparros Jimenez | G02B 19/0042 136/259 |
| 9,581,762 B2* | 2/2017 | Wertsberger | G02B 6/1228 |
| 9,780,853 B2 | 10/2017 | Urzhumov | |
| 9,800,310 B2 | 10/2017 | Urzhumov | |
| 9,967,011 B1 | 5/2018 | Lipworth et al. | |
| 10,056,698 B2 | 8/2018 | Montgomery et al. | |
| 10,218,067 B2 | 2/2019 | Black et al. | |
| 10,236,947 B2 | 3/2019 | Urzhumov | |
| 10,236,955 B2 | 3/2019 | Urzhumov | |
| 10,249,950 B1 | 4/2019 | Arnitz et al. | |
| 2002/0158798 A1 | 10/2002 | Chiang et al. | |
| 2004/0109643 A1* | 6/2004 | Kim | G02B 6/12016 385/37 |
| 2004/0162034 A1 | 8/2004 | Parker | |
| 2006/0233492 A1* | 10/2006 | Schaafsma | G02B 6/34 385/37 |
| 2007/0120439 A1 | 5/2007 | Kadota et al. | |
| 2007/0191064 A1 | 8/2007 | Skarby et al. | |
| 2008/0048917 A1 | 2/2008 | Achour et al. | |
| 2008/0052505 A1 | 2/2008 | Theobald | |
| 2008/0054899 A1 | 3/2008 | Aksoy et al. | |
| 2008/0204347 A1 | 8/2008 | Alvey et al. | |
| 2008/0223443 A1* | 9/2008 | Benitez | G02B 19/0028 136/259 |
| 2009/0213022 A1* | 8/2009 | Lier | H01Q 15/0086 343/785 |
| 2009/0284429 A1* | 11/2009 | Lier | H01Q 13/02 343/785 |
| 2010/0139739 A1* | 6/2010 | Ashkin | G02B 17/004 136/248 |
| 2010/0301971 A1 | 12/2010 | Yonak et al. | |
| 2012/0138047 A1* | 6/2012 | Ashkin | H01L 31/0547 126/619 |
| 2012/0212328 A1 | 8/2012 | Blair et al. | |
| 2013/0135159 A1 | 5/2013 | Goebel et al. | |
| 2013/0208332 A1 | 8/2013 | Yu et al. | |
| 2013/0266319 A1 | 10/2013 | Bodan et al. | |
| 2014/0056378 A1 | 2/2014 | Harel et al. | |
| 2014/0128032 A1 | 5/2014 | Muthukumar | |
| 2014/0211298 A1 | 7/2014 | Sayyah et al. | |
| 2014/0231627 A1 | 8/2014 | Wakatsuki et al. | |
| 2014/0266946 A1 | 9/2014 | Bily et al. | |
| 2014/0268436 A1 | 9/2014 | Du et al. | |
| 2014/0306784 A1 | 10/2014 | Broyde et al. | |
| 2015/0109181 A1 | 4/2015 | Hyde et al. | |
| 2015/0162658 A1 | 6/2015 | Bowers et al. | |
| 2015/0219806 A1* | 8/2015 | Arbabi | G02B 5/1847 359/573 |
| 2015/0301275 A1* | 10/2015 | Andle | H01Q 5/314 385/43 |
| 2016/0013531 A1 | 1/2016 | Casse et al. | |
| 2016/0044296 A1 | 2/2016 | Sun et al. | |
| 2016/0099674 A1* | 4/2016 | Pan | H01L 31/0543 136/246 |
| 2016/0099675 A1* | 4/2016 | Wheelwright | F24S 23/74 136/248 |
| 2016/0149312 A1 | 5/2016 | Henry et al. | |
| 2016/0190698 A1 | 6/2016 | Andresen et al. | |
| 2016/0239060 A1 | 8/2016 | Koob et al. | |
| 2016/0327745 A1* | 11/2016 | Driscoll | G03H 1/0808 |
| 2017/0063344 A1 | 3/2017 | Broyde et al. | |
| 2017/0069973 A1* | 3/2017 | Black | H01Q 15/0086 |
| 2017/0163327 A1 | 6/2017 | Yang et al. | |
| 2017/0229774 A1 | 8/2017 | Schuehler et al. | |
| 2017/0346176 A1 | 11/2017 | Linn et al. | |
| 2017/0351102 A1 | 12/2017 | Wertsberger | |
| 2018/0006375 A1 | 1/2018 | Black et al. | |
| 2018/0006376 A1 | 1/2018 | Black et al. | |
| 2018/0062265 A1 | 3/2018 | Tegreene et al. | |
| 2018/0108987 A1 | 4/2018 | Sazegar et al. | |
| 2018/0131103 A1 | 5/2018 | Bily et al. | |
| 2019/0131704 A1 | 5/2019 | Urzhumov | |

OTHER PUBLICATIONS

U.S. Appl. No. 16/361,147, Non-Final Office Action dated Jul. 17, 2020, 8 pp.

PCT International Patent Application No. PCT/US2020/023954; International Search Report and Written Opinion dated Jul. 10, 2020, 11 pp.

PCT International Patent Application No. PCT/US2020/023964; International Search Report and Written Opinion dated Jul. 10, 2020, 10 pp.

\* cited by examiner

DIFFRACTIVE CONCENTRATOR STRUCTURES

PRIORITY APPLICATIONS

The present application claims benefit of priority of U.S. Provisional Patent Application No. 62/445,023, entitled DIFFRACTIVE CONCENTRATOR STRUCTURES, naming YAROSLAV URZHUMOV as inventor, filed Jan. 11, 2017, which was filed within the twelve months preceding the filing date of the present application or is an application of which a currently co-pending priority application is entitled to the benefit of the filing date.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND AND SUMMARY

Concentrators are useful in applications where it is desirable to provide a large acceptance angle for collection of radiation arriving at an entrance aperture and then delivered to a much smaller receive aperture. For example, compound parabolic concentrators (CPCs) may be used to concentrate sunlight arriving at a large aperture onto a much smaller and more efficient solar cell. See, e.g., Julio Chaves, *Introduction to Nonimaging Optics*, 2d. ed. (2015). As another example, transformation optics can be used to make metamaterial concentrators that function as "anti-cloaks," compressing incident waves toward a central region instead of diverting waves around the central region. See, e.g., J. Pendry et al., U.S. Patent Publication No. 2008/0024792.

In the reciprocal scenario, a concentrator structure can provide a large emittance angle for radiation transmitted by a small transmit aperture and then delivered to a much larger exit aperture. One application is the implementation of a reconfigurable high-power transmitter that is dynamically tunable to adjust the field pattern of emitted radiation. On the one hand, it may be desirable to have a very large exit aperture, so that the emitted radiation can be brought to a focus within a correspondingly large radiative near field (Fresnel region) of the exit aperture. Larger exit apertures provide a larger near-field zone; additionally, the beamforming capacity of an aperture is proportional to its area. On the other hand, efficiency and cost considerations may call for having a physically small dynamic (adaptive) component. These conflicting needs can be balanced with a concentrator structure interposed between a small dynamic aperture (the transmit aperture) and a large static aperture (the exit aperture).

In some embodiments, the concentrator structure is a diffractive concentrator structure that is implemented as a thin reflective or transmissive metasurface, i.e. a surface having structural features on a scale much smaller than the wavelength of the incident radiation. A thin metasurface can be extremely low-loss, e.g. having losses of only a fraction of a dB. The diffractive concentrator can be implemented as an array of coupled conducting elements such as patches, or it can be implemented as an all-dielectric structure that is molded, machined, or 3D-printed. In either case, the diffractive concentrator can be operated in a transmissive mode as-is, or it can be backed with a reflector to operate in a reflective mode.

While diffractive concentrators may only be operable in a narrow band, they can be substantially more efficient than those based on geometrical optics, such as the compound parabolic concentrators (CPCs) that are used in solar power applications. Solar power applications may require geometrical optics to capture a broad bandwidth of incident solar power, but a narrow band diffractive concentrator is appropriate in applications such as wireless power transfer (WPT), where the overall WPT system is likely designed to operate in a specific narrow band of frequency to optimize the transfer efficiency.

In some embodiments, the diffractive concentrator can be designed via a numerical optimization approach. As a first example, for an all-dielectric implementation, the structure can be designed by conceptually dividing the structure into a large number of subwavelength pixels or voxels, and then treating the dielectric filling of each pixel or voxel as an independent control variable for an optimization problem. As a second example, for a coupled conducting patch array implementation, the structure can be designed by calculating an impedance matrix for a port network model of the patch array, where the ports have impedance values associated with them (and corresponding, to, say, lumped elements such as capacitors connected between adjacent patches); then the optimization problem reduces to a global optimization problem for which the cost function is a rational multivariate function, the optimum prescribing the lumped elements that are to be placed in the array.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1A:
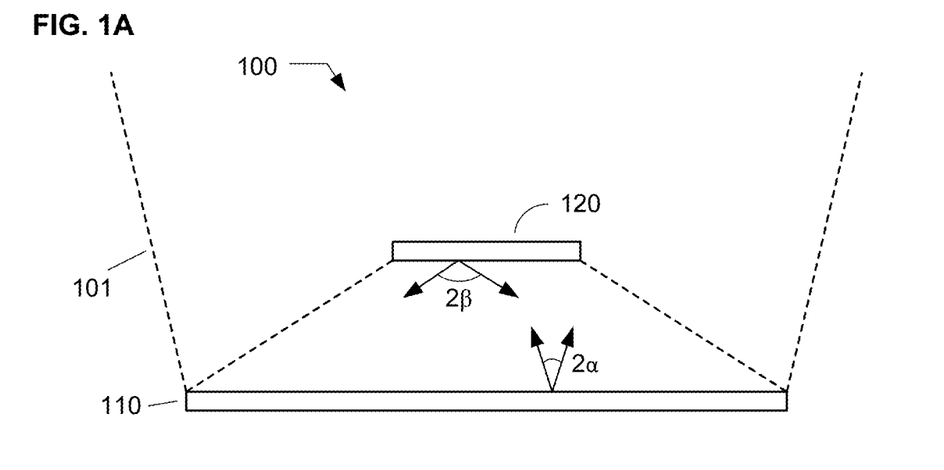
FIG. 1A depicts a reflective embodiment of a diffractive concentrator.
Figure 1B:
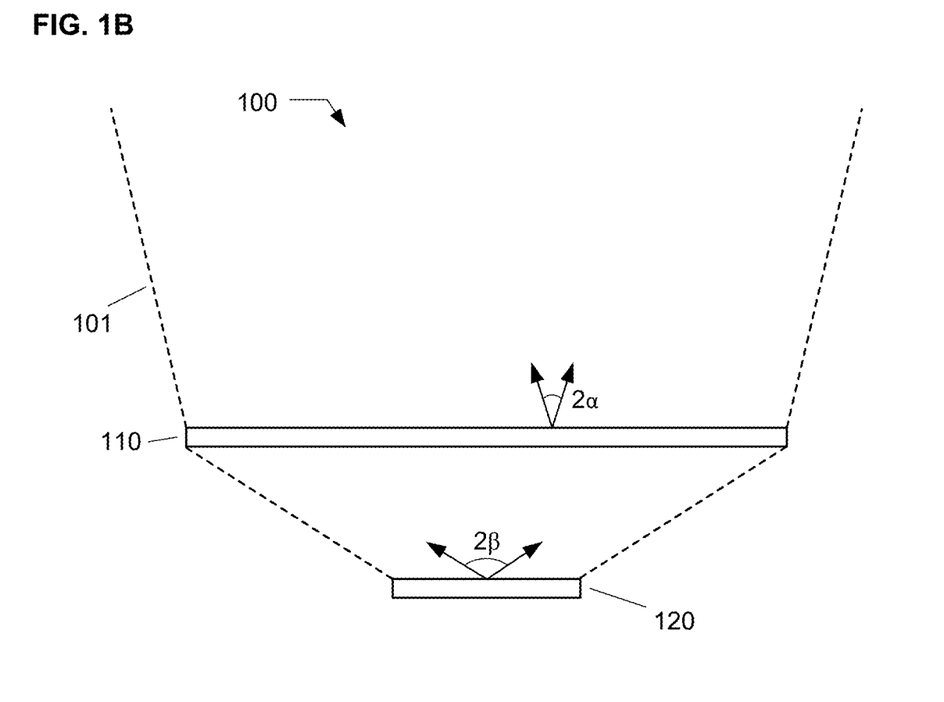
FIG. 1B depicts a transmissive embodiment of a diffractive concentrator.

FIGS. 1A and 1B depict illustrative examples of an antenna apparatus 100 that includes a diffractive concentrator 110 operable in a reflective configuration or in a transmissive configuration, respectively. In a receive scenario, radiation is received from a field of regard 101 at a large aperture corresponding to the diffractive concentrator structure 110, which sends the radiation via reflection (FIG. 1A) or via transmission (FIG. 1B) to the small aperture 120. In the reciprocal transmit scenario, radiation is transmitted by the small aperture 110 and then emitted into the field of regard 101 from the large aperture after reflection from (FIG. 1A) or after transmission through (FIG. 1B) the diffractive concentrator structure 110.

In some embodiments, the antenna apparatus 100 is a dynamic or reconfigurable antenna apparatus having a reconfigurable electromagnetic field distribution. For example, the antenna apparatus may be reconfigurable to steer a beam, or a plurality of beams, within the field of view. In some approaches, the steerable beam might be a far field directive beam; in other approaches, the steerable beam might be a beam that is focused in the radiative near field (Fresnel region), e.g. a Gaussian beam having a selectable direction and focal distance; in yet other approaches, the antenna apparatus can provide a simultaneous plurality of beams. Alternatively or additionally, the antenna apparatus may be reconfigurable to steer a null or a plurality of nulls, either in the far field or in the radiative near field.

The diffractive concentrator structure 110 can be exploited to provide a very large aperture for a reconfigurable antenna structure 110, while limiting the dynamic component of the antenna structure to a smaller aperture 120. Using a large static aperture with a smaller dynamic aperture can reduce fabrication costs and also decrease resistive losses in the tunable portion of the antenna (because high-power signals would travel shorter distances within the tunable portion). Because the fields from the large aperture are projected onto a smaller image on the small aperture, the dynamic aperture may need to provide very fine (sub-wavelength or super-Nyquist) sampling of the field distribution. In some approaches, this sub-wavelength sampling can be provided by implementing the dynamic aperture with metamaterial surface antenna technology (MSAT). Metamaterial surface antennas, also known as surface scattering antennas, are described, for example, in U.S. Patent Application Publication No. 2012/0194399 (hereinafter "Bily I"). Surface scattering antennas that include a waveguide coupled to a plurality of subwavelength patch elements are described in U.S. Patent Application Publication No. 2014/0266946 (hereinafter "Bily II"). Surface scattering antennas that include a waveguide coupled to adjustable scattering elements loaded with lumped devices are described in U.S. Application Publication No. 2015/0318618 (hereinafter "Chen I"). Surface scattering antennas that feature a curved surface are described in U.S. Patent Application Publication No. 2015/0318620 (hereinafter "Black I"). Surface scattering antennas that include a waveguide coupled to a plurality of adjustably-loaded slots are described in U.S. Patent Application Publication No. 2015/0380828 (hereinafter "Black II"). And various holographic modulation pattern approaches for surface scattering antennas are described in U.S. Patent Application Publication No. 2015/0372389 (hereinafter "Chen II"). All of these patent applications are herein incorporated by reference in their entirety.

While the apertures in FIGS. 1A and 1B are depicted as thin planar structures, these depictions are not intended to be limiting, and other embodiments may utilize non-planar structures for one or both of the diffractive concentrator 110 and the small aperture 120. For example, one or both of the diffractive concentrator 110 and the small aperture 120 may be curved to conform to a parabolic or elliptical surface. Furthermore, while the antenna apparatuses of FIGS. 1A and 1B depict the small aperture as the antenna feed, alternative feed arrangements are contemplated, such as a Cassegrian arrangement. In a first Cassegrian approach, the small aperture 120 can be implemented as a surface scattering reflector antenna (such as that described in U.S. patent application Ser. No. 14/102,253) fed by a horn or similar source (not shown), so that a transmitted wave would be first reflected from the surface scattering reflector antenna at 120 and then reflected from or transmitted by the diffractive concentrator structure 110. In a second Cassegrian approach, the small aperture 120 can be implemented as a static reflector that is fed by a surface scattering antenna, so that a transmitted wave would be emitted by a surface scattering antenna (not shown), first reflected by the static reflector at 120 and then reflected from or transmitted by the diffractive concentrator structure 110.

The optical concept of etendue is useful to characterize the concentration that can be achieved with a diffractive concentrator structure. Etendue, otherwise known as acceptance, throughput, or collecting power, is infinitesimally defined as $dG=n^2\, dS\cos\theta\, d\Omega$, where $dS$ is an infinitesimal surface element in a medium of refractive index n, receiving light within a solid angle $d\Omega$ with an incidence angle $\theta$. It can be shown that etendue is conserved in lossless optical systems, including linear diffractive optical systems such as those described herein. Scattering and absorption can increase etendue but can never decrease it, and ideal light concentration essentially involves keeping etendue as low as possible.

Conservation of etendue imposes a theoretical limit on the maximum concentration factor that can be achieved in an optical system. Suppose, as depicted in FIGS. 1A and 1B, that the large aperture 110 receives or transmits radiation within a cone of opening angle $2\alpha$, i.e. the large aperture has an acceptance angle $\alpha$; and further suppose that the small aperture 120 receives or transmits radiation within a cone of opening angle $2\beta$. Then the etendue of the radiation at the large aperture is $G_1=\pi S \sin^2\alpha$, where S is the area of the large aperture; and the etendue of the radiation at the small aperture is $G_2=\pi\Sigma \sin^2\beta$, where $\Sigma$ is the area of the small aperture (we assume, without limitation, that the system operates in free space). Conservation of etendue $G_1=G_2$ then gives $$C = \frac{S}{\Sigma} = \frac{\sin^2\beta}{\sin^2\alpha},$$

where C is the concentration of the concentrator structure 110. For a given acceptance angle $\alpha$, the concentration will be a maximum for the maximum value of $\beta$, i.e. 90°; thus, the theoretical maximum concentration is $C_{max}=1/\sin^2 \alpha$. Alternatively, for a given concentration factor C, the theoretical maximum acceptance angle is $\alpha_{max}=\sin^{-1}(1/\sqrt{C})$. For example, a concentration factor C=16 corresponds to a theoretical maximum acceptance angle $\alpha_{max}\sim 14°$.

Embodiments of the diffractive concentrator may be designed and implemented using numerical optimization approaches. Conventional concentrators (parabolic mirrors, etc.) have concentration factors at 10-30% of the theoretical maximum as described above, so there is much improvement to be made using non-imaging diffractive optics that are numerically optimized according to the design approaches described herein.

Figure 2:
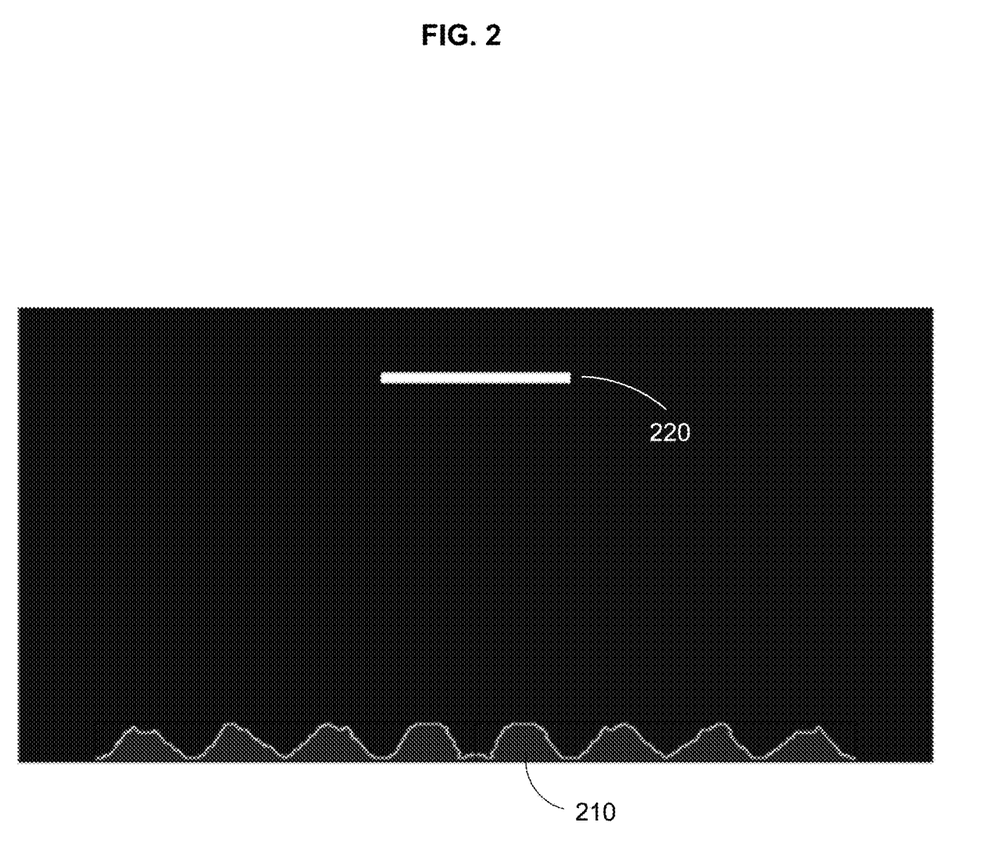
FIG. 2 depicts an example of an all-dielectric reflective diffractive concentrator.

In a first approach, the diffractive concentrator is an all-dielectric structure, and numerical optimization techniques are used to determine the distribution of dielectric material in the structure. An illustrative example is shown in FIG. 2, which shows an all-dielectric diffractive concentrator 210 and a small aperture 220 in a reflective configuration (as in FIG. 1A). In this example, the diffractive concentrator is implemented as a dielectric layer (in red) of variable thickness, positioned on top of a ground plane (for a transmissive configuration, the ground plane is omitted). The dielectric thickness profile may be determined by a shape optimization algorithm, where the thickness profile is treated as a set of independent control variables (corresponding to a subwavelength discretization of the thickness profile as a function of position on the aperture, e.g. discretization on a length scale less than or equal to about $\lambda/10$, $\lambda/5$, or $\lambda/3$); then, the algorithm uses a small perturbation to one of the control variables, and solves the forward wave propagation problem to determine the correspondingly small change in an optimization goal or cost function. The algorithm thus proceeds by computing a gradient of the cost function (i.e. the sensitivity vector) and iterating with a standard Newton, damped Newton, conjugate-gradient, or other gradient-based nonlinear solver, optionally subject to a selected constraint on the maximum thickness. In some approaches, the sensitivity vector is obtained not by solving N forward wave propagation problems (for an N-ary discretization of the dielectric thickness profile), but instead by solving a single adjoint problem that produces the entire sensitivity vector. See, e.g., U.S. Patent Publication No. 2016/0261049 (hereinafter "Driscoll"), herein incorporated by reference.

The iterative optimization algorithm continues until termination tolerances are met. A termination condition can be imposed on some norm of the sensitivity vector (e.g., L1 or L2 norm), in which case the optimization algorithm is guaranteed to converge. Alternatively, the termination condition can be imposed as an inequality on the scalar value of the cost function; in this case, the algorithm may fail to meet the imposed condition. For this reason, termination condition is usually applied to the sensitivity vector, and the final value of the optimization cost function is taken as an output of the algorithm rather than an input.

For applications that require the final value of the cost function to be below a certain tolerance, the optimization loop that failed to produce such an outcome can be repeated with a different initial guess. The above equations for the theoretical maximum performance of a concentrator can inform an assessment of the achievable tolerance. One or more optimization loops can be run for one or more respective initial guesses; such loops are entirely independent and can be computed in parallel, using distributed computing. Initial guesses can include, for example, a periodic arrangement of material (a diffraction grating). A more accurate initial guess can be a profile of a standard diffractive Fresnel lens that would bring a focus to the small adaptive aperture.

Figure 3A:
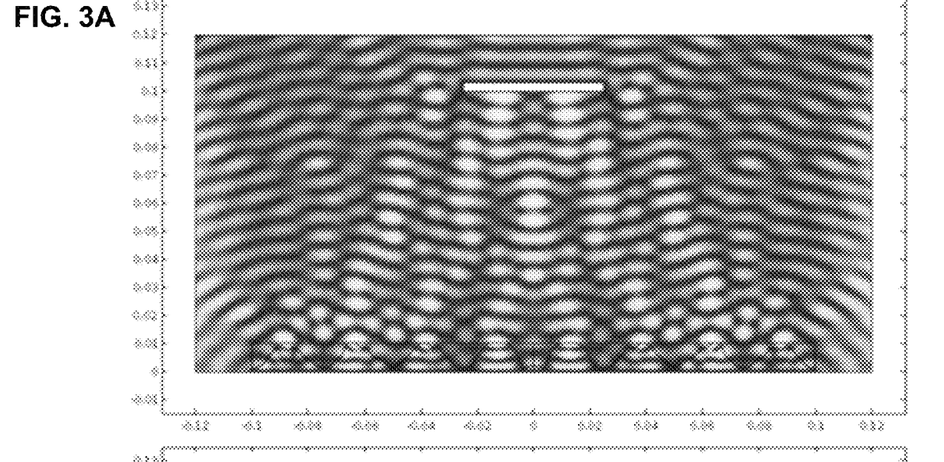
FIGS. 3A-3C depict simulations of the diffractive concentrator of FIG. 2.
Figure 3B:
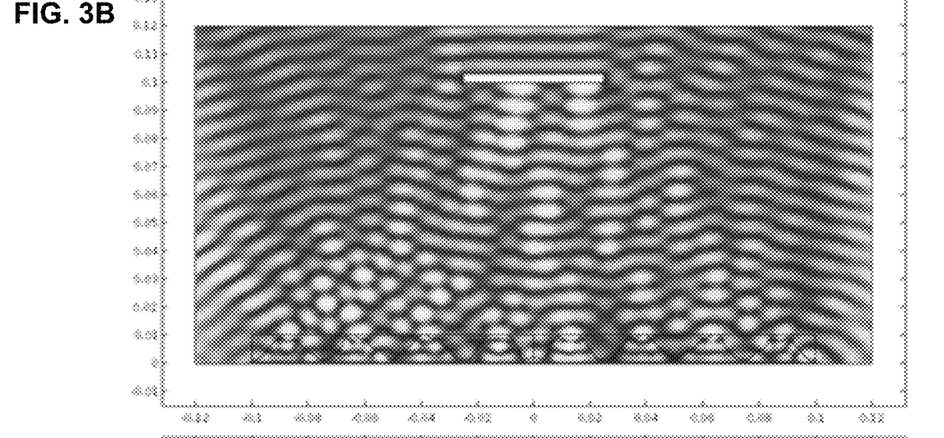
Figure 3C:
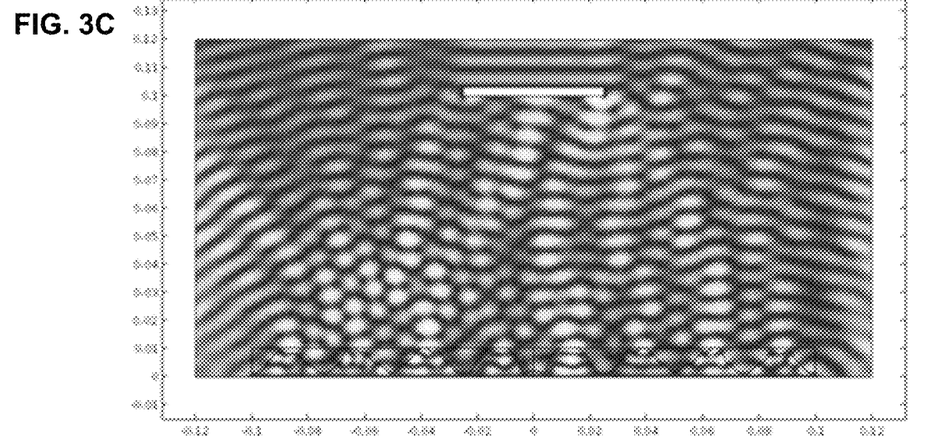

The cost function can be any function that indicates the quality of concentration obtained by the trial configuration for one or more acceptance angles of the concentrator. For example, the cost function could be the aperture efficiency (i.e. the fraction of power incident on the large aperture that is received at the small aperture), averaged over a selected set of acceptance angles. An optimization example in shown in FIGS. 3A-3C, which depict full-wave simulations for the concentrator of FIG. 2. In this example, the small aperture is scaled down by a factor of 4 with respect to the large aperture, corresponding to compression factor of 4 (in a 2D scenario) or 16 (in a 3D scenario), which yields a theoretical maximum acceptance angle of about 14°. The dielectric profile 210 was obtained by optimizing the average aperture efficiency for radiation incident at incident at 0°, 3°, and 6°, obtaining aperture efficiencies of 56%, 51%, and 31%, with full-wave simulations at these incidence angles shown in FIGS. 3A-3C, respectively.

The shape optimization yields a prescription for the dielectric thickness profile that can be input into a fabrication process. A dielectric layer of varying thickness can be readily fabricated by machining a flat slab of the dielectric material (for example, using standard CNC technology), by casting a moldable material in the desired shape, or by 3D printing. In one approach, the 3D printing is done with a single-material 3D printer, with no material in the "valleys" of the thickness profile. In another approach, the 3D printing is done with a multi-material 3D printer that prints a first dielectric material for voxels below the thickness profile and a second dielectric material for voxels above the thickness profile, up to a preselected overall height for the structure (e.g. corresponding to the maximum thickness over the entire aperture). It will be appreciated that a multi-material 3D printing process can be used to implement more complicated all-dielectric structures, e.g. having voids or overhangs; thus, in some approaches, the numerical optimization approach may proceed by optimizing not merely for shape as above, but for binary (or k-ary, for k different materials) distribution of 3D printed materials within a prescribed volume for the diffractive concentrator structure. For example, the control variables can be values of the dielectric constant for subwavelength voxels of the concentrator, or parameters of smoothed step functions, the control variables then prescribing which material fills each voxel. See, e.g., Driscoll (cited above) (describing, inter alia, optimizing a dielectric metamaterial with smoothed Heaviside functions representing the binary aspect of the dielectric material distribution).

Figure 4:
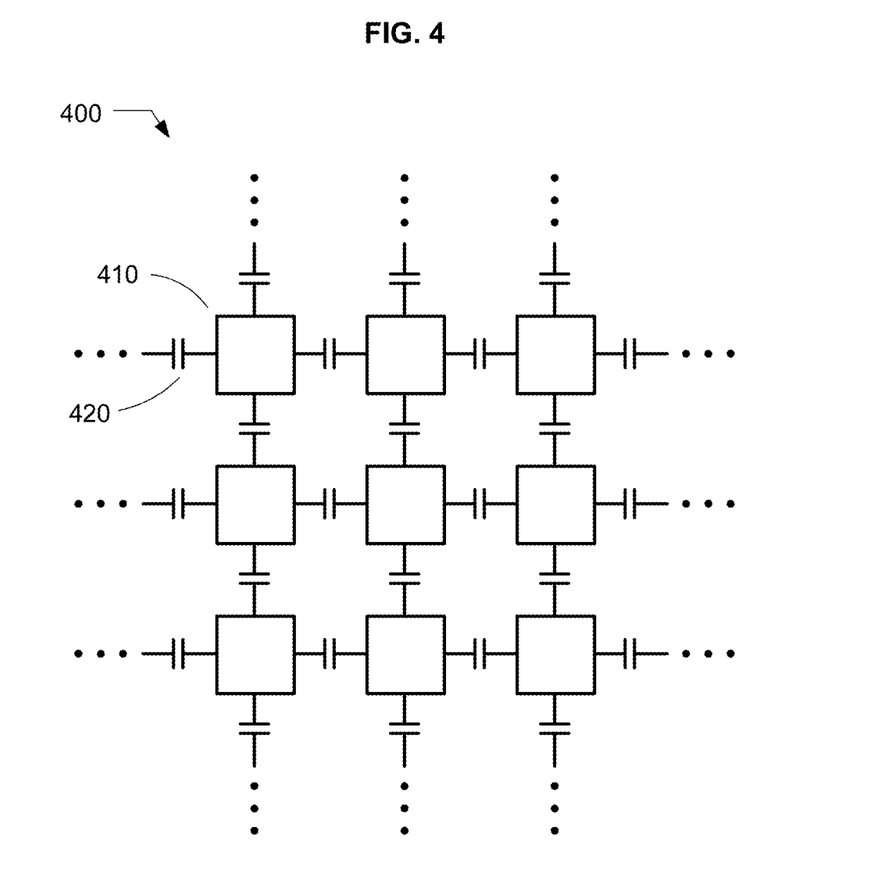
FIG. 4 depicts an example of a coupled patch array.

In a second approach, the diffractive concentrator is a coupled array of conducting elements such as patches, and numerical optimization techniques are used to determine the values of couplings between the elements. The array spacing is small compared to a wavelength of the incident radiation, e.g. less than or equal to about $\lambda/10$, $\lambda/5$, or $\lambda/3$. An illustrative example is shown in FIG. 4, which shows an array of conducting patches 401 with coupling capacitances 402 between adjacent patch elements. The coupled patch array may be fabricated via a PCB process, i.e. on a surface of a PCB dielectric substrate, with the capacitances implemented as lumped element static capacitors placed between adjacent patches (e.g. with a pick-and-place machine). For a reflective configuration, a ground plane is positioned on the back side of the PCT dielectric substrate (the ground plane is omitted for a transmissive configuration). The values of the capacitances can be determined by global optimization of a cost function that is based on a port network model of the patch array, following the tunable metamaterial optimization approach set forth in PCT Application No. PCT/US16/49965, herein incorporated by reference. In other words, the optimization proceeds by calculating an impedance matrix for a port network model of the patch array, where the ports have impedances values associated with them (corresponding to capacitances of the lumped element capacitors connected between adjacent patches). With the impedance matrix in hand, an S-matrix can be calculated as a rational function of (square roots of) the impedance values; then, with the cost function expressed in terms of the S-matrix, it is possible to globally optimize a rational function to determine optimum impedance values. Thus, the global optimization yields a prescription for the capacitance values that can be input into a PCB fabrication process, as instructions for the values of the static capacitors to be placed between adjacent pairs of patches.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus, comprising:
   a large aperture structure configured to diffractively concentrate incident electromagnetic waves onto a small aperture;
   where the large aperture structure includes a subwavelength array of conducting elements with couplings between pairs of adjacent elements.

2. The apparatus of claim 1, where the incident electromagnetic waves have a range of incidence angles ranging from zero to a substantial fraction of a theoretical maximum acceptance angle given by $\sin^{-1}(\sqrt{\Sigma/S})$, where S is an area of the large aperture and $\Sigma$ is an area of the small aperture.

3. The apparatus of claim 2, wherein the substantial fraction is about one-fourth, one-third, one-half, two-thirds, or three-fourths of the theoretical maximum acceptance angle.

4. The apparatus of claim 1, wherein the subwavelength array of conducting elements comprises a numerically optimized pattern of subwavelength features.

5. The apparatus of claim 4, wherein the large aperture structure includes a dielectric surface having a thickness profile that varies on a subwavelength scale, and the numerically-optimized pattern of subwavelength features is a shape optimization of the thickness profile.

6. The apparatus of claim 4, wherein the large aperture structure includes an assembly of subwavelength voxels each having a dielectric occupancy state, and the numerically-optimized pattern of subwavelength features is an optimization of the dielectric occupancy states.

7. The apparatus of claim 6, wherein each dielectric occupancy state is either a void or a fill with a dielectric material.

8. The apparatus of claim 6, wherein each dielectric occupancy state is either a fill with a first dielectric material or a fill with a second dielectric material.

9. The apparatus of claim 4, the numerically-optimized pattern of subwavelength features is an optimization of the couplings between pairs of adjacent elements.

10. The apparatus of claim 9, wherein the conducting elements are patches, the couplings are static capacitors, and the optimization of the couplings is an optimization of capacitance values for the static capacitors.

11. The apparatus of claim 1, wherein the large aperture structure configured to diffractively concentrate incident electromagnetic waves is a large aperture structure configured to diffractive concentrate narrowband-spectrum incident electromagnetic waves.

12. The apparatus of claim 1, wherein the large aperture structure is a reflective structure.

13. The apparatus of claim 1, wherein the large aperture structure is a transmissive structure.

14. The apparatus of claim 1, wherein the large aperture structure includes a metamaterial.

15. The apparatus of claim 1, further comprising:
    a plurality of subwavelength antenna elements distributed along the small aperture, where the subwavelength antenna elements have adjustable responses to a feed wave to provide an adjustable radiation field pattern.

16. The apparatus of claim 15, wherein the feed wave is a guided wave and the apparatus further comprises: a waveguide configured to deliver the guided wave to the subwavelength antenna elements.

17. The apparatus of claim 15, wherein the feed wave is a free space wave and the apparatus further comprises: a source configured to illuminate the subwavelength elements with the free space wave.

18. The apparatus of claim 15, wherein adjustable responses include adjustable characteristic impedances.

19. The apparatus of claim 15, wherein adjustable responses include adjustable amplification.

20. A method, comprising:
    numerically optimizing a pattern of subwavelength features of a structure that diffractively concentrates electromagnetic waves incident upon a large aperture onto a small aperture,
    wherein the numerical optimizing comprises at least a local optimization using a gradient-based nonlinear solver from one or more initial guesses for the pattern of subwavelength features corresponding to one or more Fresnel lenses that focus radiation incident on the larger aperture onto the small aperture.

21. The method of claim 20, further comprising:
    fabricating the numerically-optimized pattern of subwavelength features.

22. The method of claim 20, wherein the structure includes a dielectric layer spanning the large aperture and having a thickness profile that varies on a subwavelength scale, and the numerical optimizing of the pattern of subwavelength features is a shape optimizing of the thickness profile.

23. The method of claim 20, wherein the structure includes an assembly of subwavelength voxels spanning the large aperture, each voxel having a dielectric occupancy state, and the numerical optimizing of the pattern of subwavelength features is an optimizing of the dielectric occupancy states.

24. The method of claim 20, wherein the structure includes a subwavelength array of conducting elements with couplings between pairs of adjacent elements, and the numerical optimizing of the pattern of subwavelength features is an optimizing of the couplings.

25. The method of claim 24, wherein the optimizing of the couplings includes optimizing characteristic impedance values of lumped elements providing the couplings.

26. The method of claim 25, wherein the optimizing of characteristic impedance values includes:
   calculating an impedance matrix for a port network model of the subwavelength array; and
   globally optimizing a cost function based on the calculated impedance matrix and the characteristic impedance values.

27. The method of claim 20, wherein the numerical optimizing is a numerical optimizing for a cost function that indicates a quality of concentration for one or more acceptance angles of radiation incident on the large aperture.

28. The method of claim 27, where the cost function is an aperture efficiency averaged over a series of acceptance angles.

29. The method of claim 27, where the one or more acceptance angles are selected from a range of angles from zero to a theoretical maximum acceptance angle given by $\sin^{-1}(\sqrt{\Sigma/S})$, where S is an area of the large aperture and $\Sigma$ is an area of the small aperture.

30. The method of claim 20, wherein the numerical optimizing is a global optimizing.

31. A method, comprising:
   numerically optimizing a pattern of subwavelength features of a structure that diffractively concentrates electromagnetic waves incident upon a large aperture onto a small aperture,
   wherein the numerical optimizing comprises a local optimization using a gradient-based nonlinear solver from one or more initial guesses for the pattern of subwavelength features corresponding to one or more diffraction gratings that redirect radiation incident on the large aperture onto the small aperture.

* * * * *